(12) United States Patent
Kelkar

(10) Patent No.: US 12,515,668 B2
(45) Date of Patent: Jan. 6, 2026

(54) SYSTEMS AND METHODS FOR VEHICULAR NAVIGATION AT TRAFFIC SIGNALS

(71) Applicant: Honda Motor Co., Ltd., Tokyo (JP)

(72) Inventor: Paritosh Saurabh Kelkar, Sunnyvale, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 355 days.

(21) Appl. No.: 18/171,440

(22) Filed: Feb. 20, 2023

(65) Prior Publication Data
US 2024/0278782 A1     Aug. 22, 2024

(51) Int. Cl.
*B60W 30/18*     (2012.01)
*B60W 60/00*     (2020.01)
*G06V 20/58*     (2022.01)

(52) U.S. Cl.
CPC .... *B60W 30/18159* (2020.02); *B60W 60/001* (2020.02); *G06V 20/584* (2022.01); *B60W 2552/10* (2020.02); *B60W 2554/402* (2020.02); *B60W 2556/10* (2020.02)

(58) Field of Classification Search
CPC ......... B60W 30/18159; B60W 60/001; B60W 2552/10; B60W 2554/402; B60W 2556/10; B60W 2050/146; B60W 30/18154; B60W 50/14; G06V 20/584; G01C 21/3492; G01C 21/3658; G08G 1/00; G05D 1/00
See application file for complete search history.

(56) References Cited

U.S. PATENT DOCUMENTS

| 6,018,697 | A  | * | 1/2000  | Morimoto | G08G 1/096866 701/428 |
| 6,321,161 | B1 | * | 11/2001 | Herbst   | G08G 1/096827 340/905 |
| 6,338,021 | B1 | * | 1/2002  | Yagyu    | G01C 21/3461 340/995.19 |

(Continued)

FOREIGN PATENT DOCUMENTS

| CN | 105608918 B | 9/2018  |
| CN | 105261020 B | 11/2018 |

(Continued)

OTHER PUBLICATIONS

DE-102022105916-A1 machine translation (Year: 2022).*

*Primary Examiner* — Angelina M Shudy
(74) *Attorney, Agent, or Firm* — Armstrong Teasdale LLP

(57) ABSTRACT

A vehicle is provided. The vehicle includes a plurality of sensors. The vehicle also includes a vehicle controller. The vehicle controller is programmed to (i) detect a first traffic signal in a direction of travel of the vehicle based on the first plurality of sensor information, where the direction of travel includes a left turn at a traffic signal; (ii) determine a status of the first traffic signal based on the first plurality of sensor information; (iii) determine a first timing for the left turn at the first traffic signal based on the status of the first traffic signal; (iv) determine a second timing for the left turn at a second traffic signal, wherein the second traffic signal is subsequent to the first traffic signal; (v) compare the first timing with the second timing to determine a preferred route; and (vi) present the preferred route.

20 Claims, 8 Drawing Sheets

(56) References Cited

U.S. PATENT DOCUMENTS

| | | | |
|---|---|---|---|
| 7,949,468 B2* | 5/2011 | Nakayama | G01C 21/3644 |
| | | | 701/423 |
| 9,633,560 B1* | 4/2017 | Gao | G08G 1/07 |
| 9,672,734 B1* | 6/2017 | Ratnasingam | G08G 1/096741 |
| 9,891,060 B2 | 2/2018 | Gaither | |
| 9,922,559 B1* | 3/2018 | Inoue | G08G 1/096716 |
| 10,019,898 B2* | 7/2018 | Miller | G08G 1/08 |
| 10,054,455 B2* | 8/2018 | Asakura | G01C 21/3461 |
| 10,198,002 B2* | 2/2019 | Holben | G05D 1/0257 |
| 10,220,850 B2* | 3/2019 | Naserian | F02D 41/042 |
| 10,794,720 B2 | 10/2020 | Slavin et al. | |
| 11,125,570 B2 | 9/2021 | Prabhudeva | |
| 11,529,955 B2* | 12/2022 | Pendleton | G08G 1/075 |
| 2005/0134478 A1* | 6/2005 | Mese | G08G 1/096758 |
| | | | 340/901 |
| 2006/0155427 A1* | 7/2006 | Yang | G08G 1/07 |
| | | | 701/1 |
| 2008/0275635 A1 | 11/2008 | Jung | |
| 2009/0115632 A1* | 5/2009 | Park | G08G 1/096775 |
| | | | 340/905 |
| 2013/0013200 A1* | 1/2013 | Sato | G01C 21/3626 |
| | | | 701/516 |
| 2015/0057923 A1* | 2/2015 | Han | G08G 1/096844 |
| | | | 701/465 |
| 2016/0019783 A1* | 1/2016 | Gao | G08G 1/095 |
| | | | 340/916 |
| 2016/0027300 A1* | 1/2016 | Raamot | G08G 1/0145 |
| | | | 340/922 |
| 2016/0362628 A1* | 12/2016 | Qin | C10M 153/02 |
| 2017/0178503 A1* | 6/2017 | Gross | G08G 1/087 |
| 2017/0236412 A1* | 8/2017 | Gross | G08G 1/0965 |
| | | | 701/301 |
| 2017/0301237 A1* | 10/2017 | MacNeille | H04W 68/005 |
| 2017/0355375 A1* | 12/2017 | Ferguson | G05D 1/0088 |
| 2018/0074502 A1* | 3/2018 | Holben | G05D 1/0257 |
| 2018/0096597 A1* | 4/2018 | Mortazavi | H04W 4/023 |
| 2018/0143033 A1 | 5/2018 | Hu | |
| 2019/0088120 A1* | 3/2019 | Adireddy | G08G 1/081 |
| 2019/0107840 A1* | 4/2019 | Green | G05D 1/0223 |
| 2019/0340923 A1* | 11/2019 | Franco | G08G 1/0112 |
| 2019/0359211 A1* | 11/2019 | Matsumoto | B60W 50/14 |
| 2019/0362628 A1* | 11/2019 | Matsumoto | G08G 1/096716 |
| 2020/0005632 A1* | 1/2020 | Chen | G08G 1/096775 |
| 2020/0066148 A1* | 2/2020 | Werner | H04W 4/46 |
| 2020/0143674 A1* | 5/2020 | Wölfl | G08G 1/095 |
| 2020/0160072 A1* | 5/2020 | Slater | G06T 7/20 |
| 2020/0193818 A1* | 6/2020 | Cross | G08G 1/087 |
| 2020/0312139 A1* | 10/2020 | Kurehashi | G08G 1/096716 |
| 2021/0064057 A1* | 3/2021 | Eldar | G06V 20/56 |
| 2021/0174677 A1* | 6/2021 | Oh | G08G 1/0133 |
| 2021/0179135 A1* | 6/2021 | Ahn | B60W 30/18154 |
| 2021/0261152 A1* | 8/2021 | Meijburg | B60W 60/001 |
| 2021/0284195 A1* | 9/2021 | Zhu | G06V 20/58 |
| 2021/0287018 A1 | 9/2021 | Yoo et al. | |
| 2021/0293549 A1* | 9/2021 | Zhou | G01C 21/3841 |
| 2021/0316750 A1* | 10/2021 | Jo | B60W 30/18154 |
| 2021/0394775 A1* | 12/2021 | Julian | G06V 20/58 |
| 2021/0398422 A1* | 12/2021 | Fukumori | G08G 1/0145 |
| 2022/0076037 A1* | 3/2022 | Hochman | G05D 1/249 |
| 2022/0097723 A1* | 3/2022 | Wang | B60W 40/08 |
| 2022/0139218 A1* | 5/2022 | Shi | G08G 1/081 |
| | | | 340/907 |
| 2022/0148318 A1* | 5/2022 | Xia | G06T 7/70 |
| 2022/0270480 A1* | 8/2022 | Lee | G06N 3/088 |
| 2023/0031158 A1* | 2/2023 | Kaita | G08G 1/015 |
| 2023/0069211 A1* | 3/2023 | Kamakura | G08G 1/09623 |
| 2023/0228589 A1* | 7/2023 | Ryu | G06V 20/584 |
| | | | 701/400 |
| 2023/0326336 A1* | 10/2023 | Li | G08G 1/166 |
| | | | 340/907 |
| 2024/0123996 A1* | 4/2024 | Caesar | B60W 60/00 |
| 2024/0278783 A1* | 8/2024 | Kelkar | B60W 50/14 |

FOREIGN PATENT DOCUMENTS

| | | |
|---|---|---|
| CN | 111310593 A | 6/2020 |
| CN | 112382054 A | 2/2021 |
| CN | 107909047 B | 7/2021 |
| DE | 102022105916 A1 * | 9/2023 |
| IN | 202111004399 A | 2/2021 |
| JP | 2006277546 A | 10/2006 |

* cited by examiner

SYSTEMS AND METHODS FOR VEHICULAR NAVIGATION AT TRAFFIC SIGNALS

FIELD OF THE INVENTION

The present disclosure relates to vehicular control and navigation and, more particularly, to a system and method for controlling a vehicle travelling at traffic lights or other intersection types.

BACKGROUND

Travel time is a concern during vehicular travel. While some navigation systems may provide an overview of where to turn and potentially which lane to be in to stay on the correct road, there are other incidents that may affect travel times on a more immediate basis. These can include, but are not limited to, which lane to travel in at a light? And turn left at this light or the next? How would these decisions change based on regional variations? As automated and semi-automated cars become more widespread, they need to consider the habits of other drivers in different areas. Accordingly, it would be desirable to have a system that assists drivers and/or vehicles in navigating through traffic situations.

BRIEF SUMMARY

In one aspect, a vehicle is provided. The vehicle includes a plurality of sensors including a first sensor. The vehicle also includes a vehicle controller. The vehicle controller is programmed to collect a first plurality of sensor information observed by at least the first sensor during operation of a vehicle. The vehicle controller is also programmed to detect a red traffic signal in a direction of travel of the vehicle based on the first plurality of sensor information. The vehicle controller is further programmed to determine a number of vehicles in each lane in front of the red traffic signal based on the first plurality of sensor information. In addition, the vehicle controller is programmed to determine a vehicle type for each vehicle in each lane in front of the red traffic signal based on the first plurality of sensor information. Moreover, the vehicle controller is programmed to calculate a lane acceleration profile for each lane in front of the red traffic signal based on the number of vehicles and vehicle type for each vehicle in each lane. Furthermore, the vehicle controller is programmed to compare the lane acceleration profiles to determine a chosen lane. In addition, the vehicle controller is also programmed to present the chosen lane. The vehicle may have additional, less, or alternate functionality, including that discussed elsewhere herein.

In another aspect, a computer device is provided. The computer device includes at least one memory and at least one processor in communication with the at least one memory. The at least one processor is programmed to collect a first plurality of sensor information observed by at least the first sensor during operation of a vehicle. The at least one processor is also programmed to detect a red traffic signal in a direction of travel of the vehicle based on the first plurality of sensor information. The at least one processor is further programmed to determine a number of vehicles in each lane in front of the red traffic signal based on the first plurality of sensor information. In addition, the at least one processor is programmed to determine a vehicle type for each vehicle in each lane in front of the red traffic signal based on the first plurality of sensor information. Moreover, the at least one processor is programmed to calculate a lane acceleration profile for each lane in front of the red traffic signal based on the number of vehicles and vehicle type for each vehicle in each lane. Furthermore, the at least one processor is programmed to compare the lane acceleration profiles to determine a chosen lane. In addition, the at least one processor is also programmed to present the chosen lane. The computer device may have additional, less, or alternate functionality, including that discussed elsewhere herein.

In still another aspect, a method for controlling a vehicle is provided. The method is implemented on a vehicle controller associated with the vehicle including at least one processor in communication with at least one memory. The method includes collecting a first plurality of sensor information observed by at least the first sensor during operation of a vehicle. The method also includes detecting a red traffic signal in a direction of travel of the vehicle based on the first plurality of sensor information. The method further includes determining a number of vehicles in each lane in front of the red traffic signal based on the first plurality of sensor information. In addition, the method includes determining a vehicle type for each vehicle in each lane in front of the red traffic signal based on the first plurality of sensor information. Moreover, the method includes calculating a lane acceleration profile for each lane in front of the red traffic signal based on the number of vehicles and vehicle type for each vehicle in each lane. Furthermore, the method includes comparing the lane acceleration profiles to determine a chosen lane. In addition, the method also includes presenting the chosen lane. The method may have additional, less, or alternate functionality, including that discussed elsewhere herein.

In a further aspect, a vehicle is provided. The vehicle includes a plurality of sensors including a first sensor. The vehicle also includes a vehicle controller. The vehicle controller is programmed to collect a first plurality of sensor information observed by at least the first sensor during operation of a vehicle. The vehicle controller is also programmed to detect a first traffic signal in a direction of travel of the vehicle based on the first plurality of sensor information. The direction of travel includes a left turn at a traffic signal. The vehicle controller is further programmed to determine a status of the first traffic signal based on the first plurality of sensor information. In addition, the vehicle controller is programmed to determine a first timing for the left turn at the first traffic signal based on the status of the first traffic signal. Moreover, the vehicle controller is programmed to determine a second timing for the left turn at a second traffic signal. The second traffic signal is subsequent to the first traffic signal. Furthermore, the vehicle controller is programmed to compare the first timing with the second timing to determine a preferred route. In addition, the vehicle controller is also programmed to present the preferred route. The vehicle may have additional, less, or alternate functionality, including that discussed elsewhere herein.

In another aspect, a computer device is provided. The computer device includes at least one memory and at least one processor in communication with the at least one memory. The at least one processor is programmed to collect a first plurality of sensor information observed by at least the first sensor during operation of a vehicle. The at least one processor is also programmed to detect a first traffic signal in a direction of travel of the vehicle based on the first plurality of sensor information. The direction of travel includes a left turn at a traffic signal. The at least one processor is further programmed to determine a status of the first traffic signal based on the first plurality of sensor information. In addition, the at least one processor is programmed to determine a first timing for the left turn at the first traffic signal based on the status of the first traffic signal. Moreover, the at least one processor is programmed to determine a second timing for the left turn at a second traffic signal. The second traffic signal is subsequent to the first traffic signal. Furthermore, the at least one processor is programmed to compare the first timing with the second timing to determine a preferred route. In addition, the at least one processor is also programmed to present the preferred route. The computer device may have additional, less, or alternate functionality, including that discussed elsewhere herein.

In still another aspect, a method for controlling a vehicle is provided. The method is implemented on a vehicle controller associated with the vehicle including at least one processor in communication with at least one memory. The method includes collecting a first plurality of sensor information observed by at least a first sensor during operation of a vehicle. The method also includes detecting a first traffic signal in a direction of travel of the vehicle based on the first plurality of sensor information. The direction of travel includes a left turn at a traffic signal. The method further includes determining a status of the first traffic signal based on the first plurality of sensor information. In addition, the method includes determining a first timing for the left turn at the first traffic signal based on the status of the first traffic signal. Moreover, the method includes determining a second timing for the left turn at a second traffic signal. The second traffic signal is subsequent to the first traffic signal. Furthermore, the method includes comparing the first timing with the second timing to determine a preferred route. In addition, the method also includes presenting the preferred route. The method may have additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
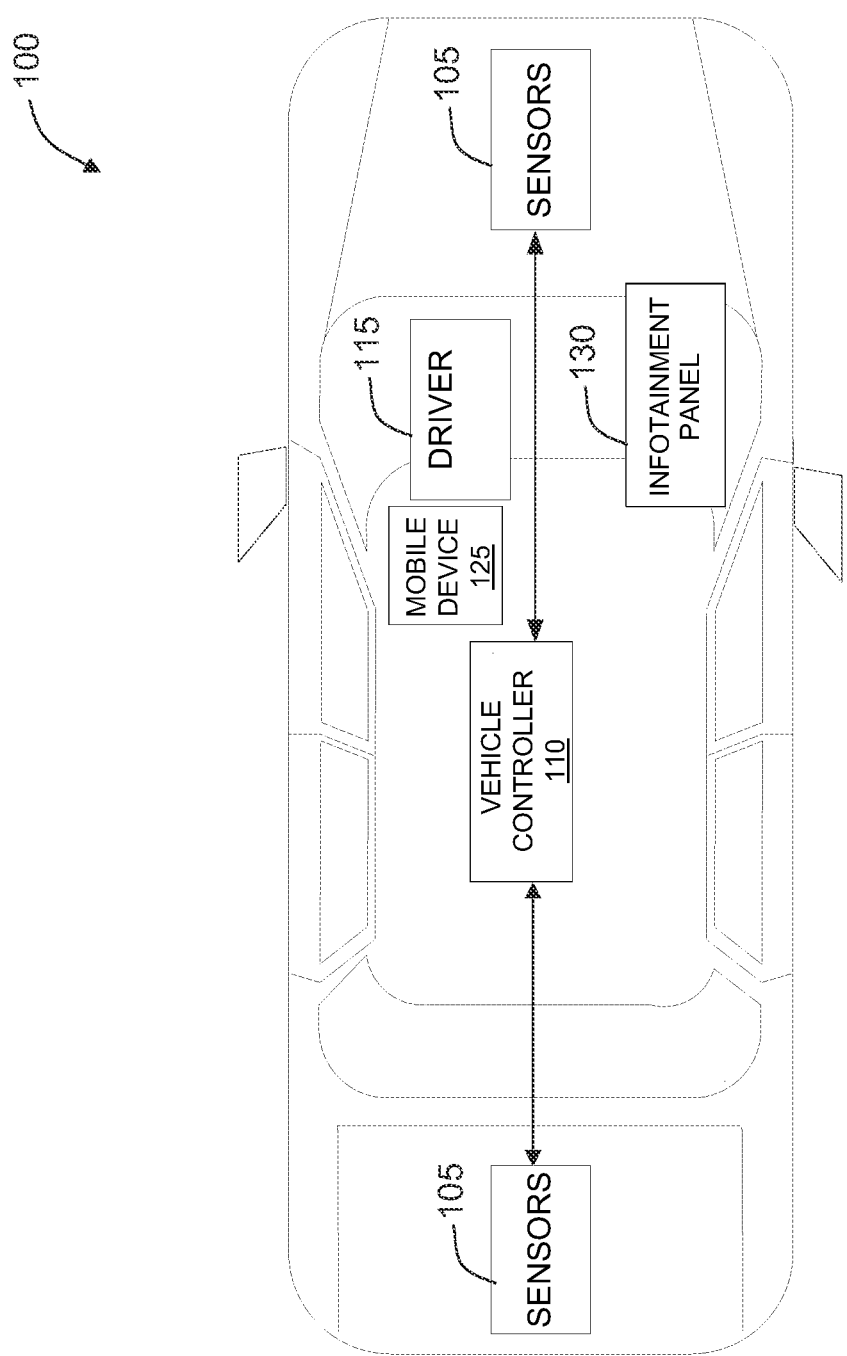
FIG. 1 illustrates a schematic diagram of an exemplary vehicle, in accordance with one embodiment of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

A computer program of one embodiment is embodied on a computer-readable medium. In an example, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

The present embodiments may relate to, inter alia, systems and methods for controlling a vehicle travelling through an intersection based upon sensor data. In an exemplary embodiment, the process is performed by a vehicle controller computer device, also known as a vehicle controller.

In the exemplary embodiment, the vehicle includes a plurality of sensors that allow the vehicle to observe its surroundings in real-time. The sensors can include, but are not limited to, radar, LIDAR, proximity sensors, ultrasonic sensors, electromagnetic sensors, wide RADAR, long distance RADAR, Global Positioning System (GPS), video devices, imaging devices, cameras, audio recorders, and computer vision. The vehicle controller receives information from the sensors. In one embodiment, based on the information from the sensors, the vehicle controller determines that the vehicle is coming up to a red traffic light or signal (or stop sign). The vehicle controller analyzes the vehicles at the red traffic light and makes a recommendation on which lane to go into based on the vehicles already at or around the light. In another embodiment, the vehicle controller determines that the vehicle needs to make a left turn. The vehicle controller uses the information from the sensors to determine if the vehicle should take the left at the current light or a subsequent left based on the number and types of vehicles in the left turn lane, the current state of the light, the timing for the light, and user preferences.

In the lane recommendation embodiments, the vehicle controller determines the type of each vehicle at the red traffic light or signal that the vehicle is approaching. The vehicle controller then determines the acceleration profile for each vehicle based on the type and potentially other information. Then the vehicle controller combines the acceleration profiles for all of the vehicles in each lane, the vehicle controller determines the final acceleration profile for each lane. Based on the final acceleration profiles, the vehicle controller makes a recommendation of which lane the vehicle should go into while waiting for the light to change to green. The recommended lane is the lane which has the highest likelihood that the vehicles in the lane will accelerate the fastest after the light changes to green. In some further embodiments, the vehicle controller also determines if any vehicles are unsafe to get behind. For example, a truck may have a load of precariously balanced lumber or a trailer may have an open door that is moving back and forth.

In the left turn embodiments, the vehicle controller determines a number of vehicles in a left turn lane as well as the state of the light. Based on the known timing of the left turn signal and the types and number of vehicles at the light, the vehicle controller determines when the left turn signal will next be available. The vehicle controller also knows the timing of the next left turn signal. Based on that comparison, the vehicle controller determines how to route the vehicle.

In the exemplary embodiment, the vehicle controller detects the vehicles and light status using a first set of sensors, such as cameras. In other embodiments, the vehicle controller may also use LIDAR, RADAR, laser sensors, proximity sensors, ultrasonic sensors, and/or any other sensor type(s) that allow the system to work as described herein.

In some embodiments, the user/driver may store preferences that would let the vehicle controller know if there are any extra considerations in its decision making process. The vehicle controller may use these preferences as weights in its decision making process. In some of these embodiments, the user directly enters their preferences. In other embodiments, the vehicle controller learns these preferences over time based on the user's driving behavior. Other preferences may include regional or national preferences based on observations of the vehicle controller and/or a plurality of vehicle controllers. For example, one regional preference may be that drivers in that region generally start moving as soon as or slightly before the light changes, while in other regions, there may be a general delay before drivers start moving when a light changes. Another regional preference may be whether or not vehicles in the region continue to traverse an intersection for a few seconds after a light turns red.

At least one of the technical problems addressed by this system may include: (i) improving the accuracy of vehicular travel through intersections; (ii) reducing the travel time based on traffic light behavior; (iii) reducing the time spent at traffic lights; and (iv) alerting the driver and/or vehicle to potentially hazardous conditions.

The methods and systems described herein may be implemented using computer programming or engineering techniques including computer software, firmware, hardware, or any combination or subset thereof, wherein the technical effects may be achieved by performing at least one of the following steps: a) collect a first plurality of sensor information observed by at least the first sensor during operation of a vehicle; b) detect a red traffic signal in a direction of travel of the vehicle based on the first plurality of sensor information; c) determine a number of vehicles in each lane in front of the red traffic signal based on the first plurality of sensor information; d) determine a vehicle type for each vehicle in each lane in front of the red traffic signal based on the first plurality of sensor information; e) calculate a lane acceleration profile for each lane in front of the red traffic signal based on the number of vehicles and vehicle type for each vehicle in each lane; f) compare the lane acceleration profiles to determine a chosen lane; g) present the chosen lane; h) store a plurality of vehicle acceleration profiles for a plurality of vehicle types, wherein each vehicle acceleration profile represents an amount of time for the corresponding vehicle type of the plurality of vehicle types to accelerate from a stop; i) receive the plurality of vehicle acceleration profiles from a remote server; j) determine if a first vehicle is towing a trailer; k) adjust the vehicle acceleration profile for the first vehicle based on the trailer; l) detect a safety issue based on the plurality of sensors; m) determine the chosen lane based on the comparison of the lane acceleration profiles and the safety issue; n) determine a number of lanes in front of the red traffic signal; o) for each lane, determine a number of vehicles in the corresponding lane; p) determine a desired direction of travel for the vehicle; q) filter out lanes not leading in the desired direction of travel for the vehicle; r) steer the vehicle into the chosen lane; s) display the chosen lane on via the display device; t) receive a second plurality of sensor information from a second vehicle at the red traffic signal; u) receive a second plurality of sensor information from one or more infrastructure based sensors at the red traffic signal; v) observe acceleration of a first vehicle at a first traffic signal; w) detect the first vehicle at a second traffic signal; and x) assign the observed acceleration to the first vehicle at the second traffic signal.

In still further embodiments, the technical effects may be achieved by performing at least one of the following steps: a) collect a first plurality of sensor information observed by at least the first sensor during operation of a vehicle; b) detect a first traffic signal in a direction of travel of the vehicle based on the first plurality of sensor information, wherein the direction of travel includes a left turn at a traffic signal; c) determine a status of the first traffic signal based on the first plurality of sensor information; d) determine a first timing for the left turn at the first traffic signal based on the status of the first traffic signal; e) determine a second timing for the left turn at a second traffic signal, wherein the second traffic signal is subsequent to the first traffic signal; f) compare the first timing with the second timing to determine a preferred route; g) present the preferred route; h) determine a number of lanes in front of the first traffic signal; i) for each lane, determine a number of vehicles in the corresponding lane; j) determine the first timing based on the number of vehicles in the corresponding lanes in front of the first traffic signal; k) determine the status of the first traffic signal based on the number of vehicles at the first traffic signal; l) determine the first timing based on a number of vehicles in a left turn lane at the first traffic signal; m) determine the first timing based on a vehicle type of each vehicle in the left turn lane at the first traffic signal; n) retrieve timing information for the first traffic signal based on historical observations of the first traffic signal, wherein the historical observations of the first traffic signal are based on sensor information from the plurality of sensors of the vehicle, and/or wherein the historical observations of the first traffic signal are based on sensor information from a plurality of vehicles each with a plurality of sensors; o) determine the second timing for the left turn at the second traffic signal based on a plurality of historical observations by the plurality of sensors of the vehicle at a plurality of points in time; p) determine the second timing for the left turn at the second traffic signal based on a plurality of historical observations by a plurality of vehicles each with a plurality of sensor at a plurality of points in time; q) determine the second timing for the left turn at the second traffic signal based on sensor data from at least one vehicle currently at the second traffic signal; r) steer the vehicle according to the preferred route; s) display the preferred route on via the display device of the vehicle, t) receive a second plurality of sensor information from a second vehicle at the first traffic signal; u) receive a second plurality of sensor information from one or more infrastructure based sensors at the first traffic signal; v) determine a third timing for the left turn at a third traffic signal, wherein the third traffic signal is subsequent to the second traffic signal; w)

compare the first timing with the second timing and the third timing to determine the preferred route; and x) compare the first timing and the second timing with a plurality of user preferences to determine the preferred route.

FIG. 1 depicts a view of an exemplary vehicle 100. In some embodiments, vehicle 100 may be an autonomous or semi-autonomous vehicle capable of fulfilling the transportation capabilities of a traditional automobile or other vehicle. In these embodiments, vehicle 100 may be capable of sensing its environment and navigating without human input. In other embodiments, vehicle 100 is a manual vehicle or a semi-autonomous vehicle with driver assistance systems, such as, but not limited to, lane keep assistance and parallel parking assistance, where the vehicle may be as a traditional automobile that is controlled by a driver 115.

Vehicle 100 may include a plurality of sensors 105 and a vehicle controller 110. The plurality of sensors 105 may detect the current surroundings and location of vehicle 100. Plurality of sensors 105 may include, but are not limited to, radar, LIDAR, proximity sensors, ultrasonic sensors, electromagnetic sensors, wide RADAR, long distance RADAR, Global Positioning System (GPS), video devices, imaging devices, cameras, audio recorders, and computer vision. Plurality of sensors 105 may also include sensors that detect conditions of vehicle 100, such as speed, acceleration, gear, braking, and other conditions related to the operation of vehicle 100, for example: at least one of a measurement of at least one of speed, direction rate of acceleration, rate of deceleration, location, position, orientation, and rotation of the vehicle, and a measurement of one or more changes to at least one of speed, direction rate of acceleration, rate of deceleration, location, position, orientation, and rotation of the vehicle. Furthermore, plurality of sensors 105 may include impact sensors that detect impacts to vehicle 100, including force and direction and sensors that detect actions of vehicle 100, such the deployment of airbags. In some embodiments, plurality of sensors 105 may detect the presence of driver 115 and one or more passengers (not shown) in vehicle 100. In these embodiments, plurality of sensors 105 may detect the presence of fastened seatbelts, the weight in each seat in vehicle 100, heat signatures, or any other method of detecting information about driver 115 and/or passengers in vehicle 100.

In some embodiments, the plurality of sensors 105 may include sensors for determining weight distribution information of vehicle 100. Weight distribution information may include, but is not limited to, the weight and location of remaining gas, luggage, occupants, and/or other components of vehicle 100. In some embodiments, plurality of sensors 105 may include sensors for determining remaining gas, luggage weight, occupant body weight, and/or other weight distribution information. Furthermore, the plurality of sensors 105 may detect attachments to the vehicle 100, such as cargo carriers or bicycle racks attached to the top of the vehicle 100 and/or a trailer attached to a hitch on the rear of the vehicle 100.

In some embodiments, the plurality of sensors 105 include cameras, LIDAR, radar, proximity detectors, and/or other sensors 105 that provide information about the surroundings of the vehicle 100, such as, but not limited to, other vehicles including vehicle type and vehicle load, obstacles, traffic flow information including road signs, traffic lights, and other traffic information, and/or other environmental information.

Vehicle controller 110 may interpret the sensory information to identify appropriate navigation paths, detect threats, and react to conditions. In some embodiments, vehicle controller 110 may be able to communicate with one or more remote computer devices, such as mobile device 125. In the example embodiment, mobile device 125 is associated with driver 115 and includes one or more internal sensors, such as an accelerometer, a gyroscope, and/or a compass. Mobile device 125 may be capable of communicating with vehicle controller 110 wirelessly. In addition, vehicle controller 110 and mobile device may be configured to communicate with computer devices located remotely from vehicle 100.

The vehicle controller 110 may receive user preferences from the user through the mobile device 125 or an infotainment panel 130. The vehicle controller 110 may also receive preferences via one or more remote servers, such as vehicle traffic light controller 610 (shown in FIG. 6). These remote servers may be associated with the vehicle manufacturer or other service provider that provides preference information. The remote servers may also provide traffic information including, but not limited to, travel routes, maps, traffic light timing, and current traffic load in areas around the vehicle 100.

In some embodiments, vehicle 100 may include autonomous or semi-autonomous vehicle-related functionality or technology that may be used with the present embodiments to replace human driver actions may include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality. In these embodiments, the autonomous or semi-autonomous vehicle-related functionality or technology may be controlled, operated, and/or in communication with vehicle controller 110.

The wireless communication-based autonomous or semi-autonomous vehicle technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality may include and/or be related to: driver alertness or responsive monitoring; pedestrian detection; artificial intelligence and/or back-up systems; hazard avoidance; navigation or GPS-related systems; security and/or anti-hacking measures; and/or theft prevention systems.

While vehicle 100 may be an automobile in the exemplary embodiment, in other embodiments, vehicle 100 may be, but is not limited to, other types of ground craft, aircraft, watercraft, and spacecraft vehicles.

Figure 2:
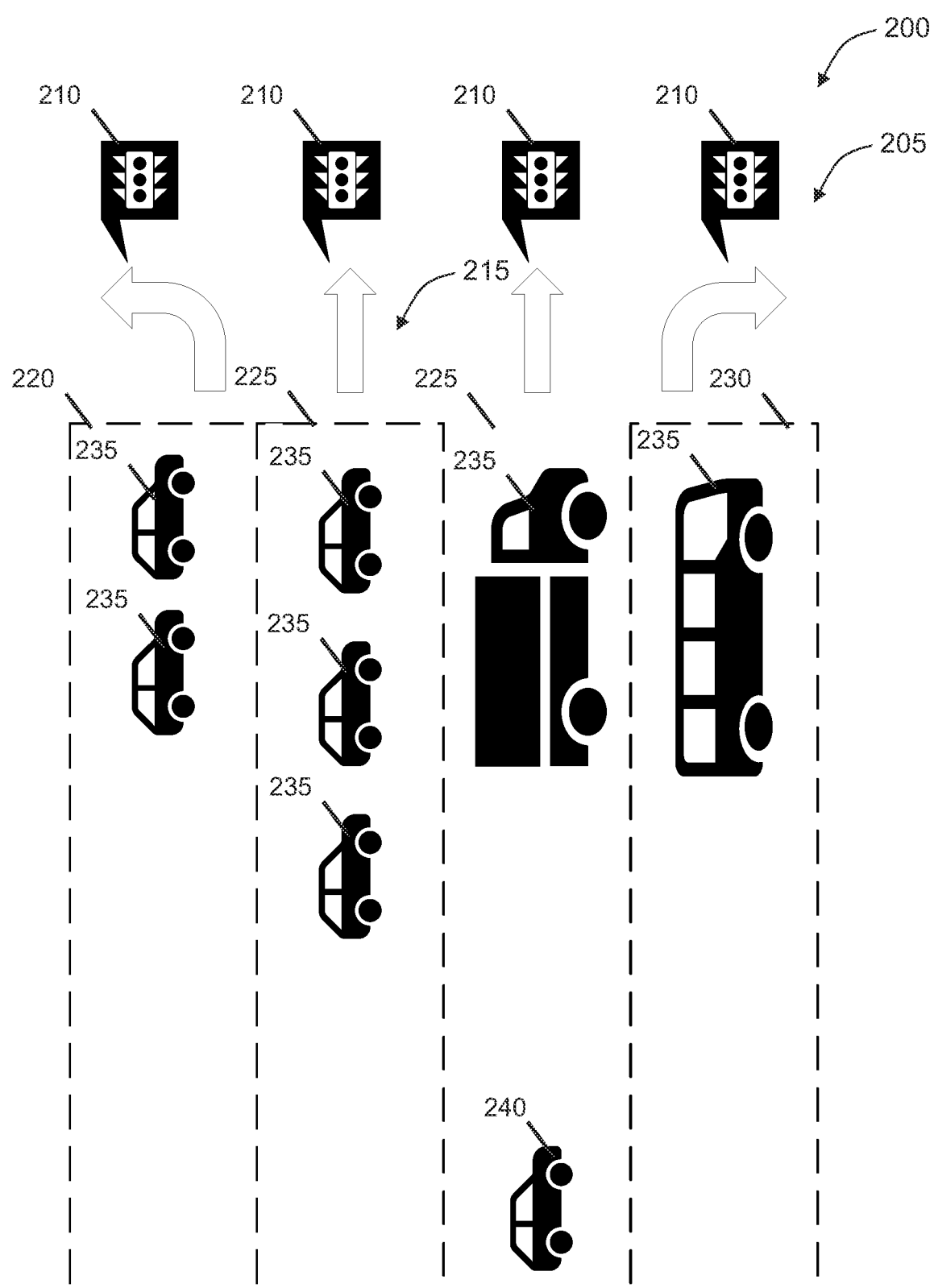
FIG. 2 illustrates a schematic diagram of an exemplary intersection with a plurality of vehicles, in accordance with one embodiment of the present disclosure.

FIG. 2 illustrates a schematic diagram 200 of an exemplary intersection 205 with a plurality of vehicles, in accordance with one embodiment of the present disclosure.

In the exemplary embodiment, intersection 205 has a plurality of traffic signals 210 (also known as traffic lights 210) for a plurality of lanes 215. The plurality of lanes 215 can includes left turn lanes 220, straight lanes 225, and/or right turn lanes 230. As shown in diagram 200, each lane 215 includes one or more vehicles 235. For the purposes of this discussion, the vehicles 235 can include, but are not limited to, sedans, sportscars, vans, panel vans, pick-up trucks, buses, trolley cars, public transportation, tractor trailers, 18-wheelers, RVs (recreational vehicle), motorcycles, scooters, bicycles, trailers, emergency vehicles, farm vehicles, oversized vehicles, and/or any other type of vehicle 235. In addition to vehicles 235, there is also the user's vehicle 240. In the exemplary embodiment, user's vehicle 240 is similar to vehicle 100 (shown in FIG. 1), where user's vehicle 240 includes a vehicle controller 110 (shown in FIG. 1).

Figure 3:
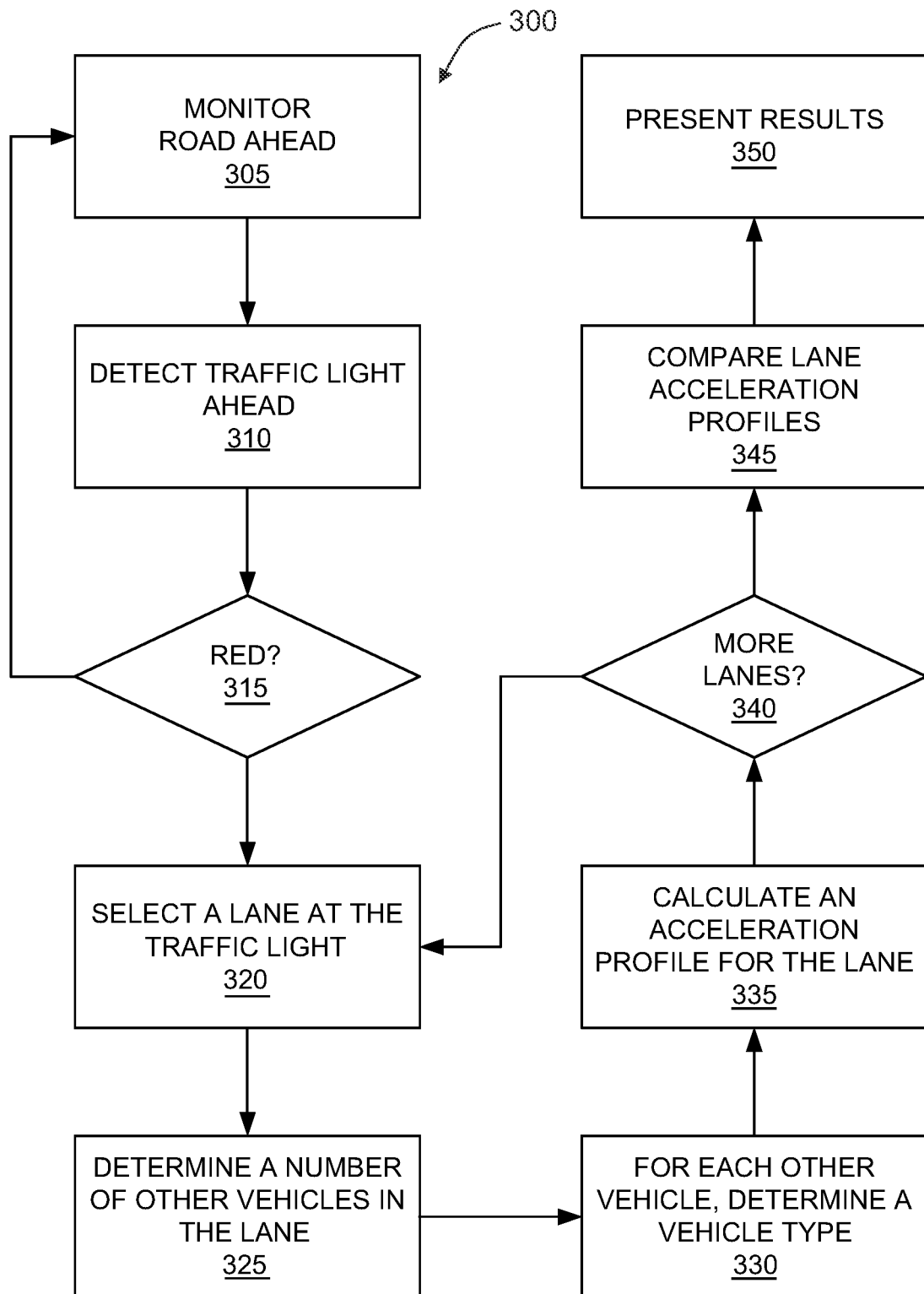
FIG. 3 illustrates a flowchart of a process for selecting a lane at an intersection in accordance with at least one embodiment.

FIG. 3 illustrates a flowchart of a process 300 for selecting a lane at a traffic light in accordance with at least one embodiment. In the exemplary embodiment, process 300 is performed by the vehicle controller 110 (shown in FIG. 1) in the user's vehicle 240 (shown in FIG. 2) when approaching an intersection, such as intersection 205 (shown in FIG. 2). In other embodiments, portions of process 300 are performed by the vehicle controller 110 and other portions of the process are performed by one or more remote servers. In the exemplary embodiment, diagram 200 (shown in FIG. 2) is used to illustrate process 300.

In the exemplary embodiment, the vehicle controller 110 monitors 305 the road ahead of the user's vehicle 240. The vehicle controller 110 receives sensor data from at least a first sensor 105 of the plurality of sensors 105 (both shown in FIG. 1). In some embodiments, the first sensor 105 includes at least one of a camera, RADAR, LIDAR, or other sensor able to detect objects at a distance.

Based on the received sensor data, the vehicle controller 110 detects 310 a traffic light 210 (shown in FIG. 2) at intersection 205 ahead. The traffic light 210 is along the current route of travel of the vehicle 100. In the exemplary embodiment, the vehicle controller 110 detects 310 the traffic light 210 about half of a block away or the usual distance that the vehicle controller 110 would react to a red traffic light 210. Accordingly, this distance would vary based on the speed of the vehicle 240, the limitations of the plurality of sensors 105, current visibility, the stopping distance of the vehicle 240, as well as other environmental factors.

The vehicle controller 110 determines 315 if the traffic light 210 is red. In some embodiments, the first sensor 105 can detect the surroundings in color and the determination 315 could be made based on analysis of the visible color of the traffic light 210. In other embodiments, the first sensor 105 can only detect the surroundings in greyscale and the determination 315 can be made based on the brightness and position of an illuminated portion of the traffic light 210. If the traffic light 210 is not red, then the vehicle controller 110 returns to step 305 and monitors the road ahead. If the traffic light 210 does turn red before the user's vehicle 100 enters the intersection 205, then the process 300 will advance to step 320.

If the traffic light 210 is red, either when first detected or later when the traffic light 210 changes, the vehicle controller 110 determines how many lanes 215 (shown in FIG. 2) there are in front of the traffic light. The vehicle controller 110 also determines what type of lane each is. For example, there may be two lanes for going straight 225, a left turn only lane 220, and a right turn only lane 230 (all shown in FIG. 3). In some embodiments, the vehicle controller 110 determines the types of lanes 215 from detected signage. In other embodiments, the vehicle controller 110 receives the information about the types of lanes 215 from a remote server, such as from a mapping program.

In the exemplary embodiment, the vehicle controller 110 selects 320 a lane 215 at the traffic light 210. In the exemplary embodiment, the vehicle controller 110 selects 320 a lane 225 for travelling straight. However, in other embodiments, the vehicle controller 110 may know that the user will be turning left or right and select one of multiple left turn 220 or right turn lanes 230. In some embodiments, the vehicle controller 110 knows the direction that the user's vehicle 100 will be traveling after the traffic light 210, such as through a route on a mapping program or through the use of turn signals.

In the exemplary embodiment, the vehicle controller 110 determines 325 a number of other vehicles 235 (shown in FIG. 2) in the selected lane 215. For each other vehicle 235 in the selected lane 215, the vehicle controller 110 determines 330 a vehicle type for the corresponding other vehicle 235. Vehicles types can include, but are not limited to, sedan, sportscar, van, panel van, pick-up truck, bus, trolley car, public transportation, tractor trailer, 18-wheeler, RV (recreational vehicle), motorcycle, scooter, bicycle, trailer, emergency vehicle, farm vehicle, oversized vehicle, and/or any other type of vehicle. The vehicle controller 110 may also detect if the vehicle 235 is pulling a trailer, which will change its acceleration profile.

Based on the other vehicles 235 in the lane and the type of each vehicle, the vehicle controller 110 calculates 335 an acceleration profile for the lane. For each other vehicle, the vehicle controller 110 determines an acceleration profile based on the vehicle type. The acceleration profile includes how fast the other vehicle 235 generally accelerates from a full stop. In some embodiments, the acceleration profile determines how long it takes for average vehicles of the vehicle type to accelerate from stopped to the current speed limit or the current speed of traffic for this road. In some embodiments, the acceleration profile is an average acceleration for the vehicle type. In other embodiments, the acceleration profile is the actual observed acceleration for that vehicle 235, where the vehicle controller 110 has observed the same other vehicle 235 at previous traffic signals 210. The vehicle controller 110 calculates 335 the acceleration profile for all of the other vehicles 235 currently in the lanes 215 between the user's vehicle 240 and the intersection 205. Some other vehicles 235 may have faster acceleration profiles than others, but may be constrained by the other vehicles 235 in front of them. For example, if a sedan is behind an 18-wheeler pulling a trailer, the sedan will only be able to accelerate based on the acceleration of the 18-wheeler.

In some embodiments, the vehicle controller 110 also adds additional information to the calculation 335 based on the current weather conditions. In these embodiments, the vehicle controller 110 may update the acceleration profiles based on the current weather conditions, such as, but not limited to, rain, snow, low visibility, and/or other conditions. In still further embodiments, the vehicle controller 110 adjusts the acceleration profiles based on the time of day, including, but not limited to, day, night, twilight, dawn, rush hour, lunch hour, and/or other times that may be important to the timing of that particular intersection.

Once the acceleration profile for the selected lane 215 is calculated 335, the vehicle controller 110 determines 340 if there are more lanes 215 to analyze. If there are more lanes 215, then the vehicle controller 110 returns to step 320 and selects a different lane 215 to analyze. If there are no more lanes 215, then the vehicle controller 110 compares 345 the lane acceleration profiles. In the exemplary embodiment, the vehicle controller 110 determines which lane 215 has the fastest acceleration profile. For example, one lane may have four sedans while another lane has a single 18-wheeler. The acceleration profile of the four sedans combined together may be faster than the single 18-wheeler. In this example, the vehicle controller 110 would determine that the first lane 215 would be faster.

Once the comparison 345 is made, the vehicle controller 110 presents 350 the results. In some embodiments, the vehicle controller 110 presents 350 the results to the driver 115 (shown in FIG. 1), such as via the infotainment panel 130 or via a heads-up display in the front windshield of the user's vehicle 240. In other embodiments, where the user's vehicle 240 is an autonomous or semi-autonomous vehicle 240, the vehicle controller 110 uses the comparison 345 to determine which lane 215 to steer the user's vehicle 100 into at the traffic light 210.

While the above description is based around a traffic light or signal 210 at an intersection 205, other embodiments may be possible, including, but not limited to, traffic signs, such as stop signs; flashing red lights; railroad crossing lights; toll booths; interstate/highway on-ramp lights; and/or any other traffic situation where multiple vehicles 235 wait in lanes 215 or other queues.

In some embodiments, the vehicle types and acceleration profiles are pre-programmed into the vehicle controller 110. In further embodiments, the vehicle types and/or acceleration profiles are generated or updated by the vehicle controller 110 based on observation of other vehicles 235. In still further embodiments, the vehicle types and/or acceleration profiles are provided by or updated by one or more remote servers. In additional embodiments, these remote servers are in communication with a plurality of users' vehicles 240, where the users' vehicles 240 provide sensor information to the remote servers such that the remote servers can update and/or generate acceleration profiles and/or vehicle types from the received sensor information over time.

In some additional embodiments, the remote servers provide regional adjustments to the acceleration profiles based on the current location of the user's vehicle 240. These regional adjustments may be based on sensor information from a plurality of users' vehicles 240 within the current region.

In the exemplary embodiment, the vehicle controller 110 calculates a cost function to determine which lane 215 to suggest. The cost function may have a plurality of parameters which provide different weights, such as, but not limited to, acceleration, safety, user preferences, regional information, weather conditions, time of day, and/other factors.

In many embodiments, the vehicle controller 110 and/or the remote servers, such as vehicle traffic light controller 610 (shown in FIG. 6), execute machine learning algorithms to calculate and/or update acceleration profiles. Furthermore, the vehicle controller 110 and/or the remote servers can also learn the driving profile for the driver 115. If the driver 115 generally doesn't mind being in the slow lane 215 because their current route will require a turn in a few blocks, lights, miles, etc., then the vehicle controller 110 may not recommend the fastest lane 215 unless it would be easy for the driver 115 to change lanes after the current traffic light 210.

In some embodiments, the processing of process 300 is performed by the one or more remote servers, such as vehicle traffic light controller 610 (shown in FIG. 6), where the vehicle controller 110 provides the user's vehicle's sensor information to the remote servers and the remote servers present 350 the results and suggested lane 215 to the vehicle controller 110. In some of these embodiments, the remote servers receive the sensor information from a plurality of vehicles 235 at the intersection and is able to use that information to improve the processing of lane suggestions for later user's vehicles 240 at the intersection. For example, a first user's vehicle 240 may be the second sedan in a first lane. Subsequently, a second user's vehicle 240 approaches the intersection. The sensor information from the first user's vehicle 240 is used to determine the acceleration profiles for the vehicles 235 ahead of the second user's vehicle 240. The first vehicle 240 could also provide information to the other vehicles 235 around it, such as through vehicle-to-vehicle communication or a vehicle mesh network.

In some embodiments, the sensor information could be provided by infrastructure, such as one or more cameras at the traffic light 210, where the cameras provide the sensor information to the user's vehicle 240, such as through short range broadcasts. The sensor information could include the images, number of vehicles 235, vehicle types, light timing, and other information.

In still further embodiments, the vehicle controller 110 and/or the remote servers, such as vehicle traffic light controller 610 (shown in FIG. 6), analyze the safety of the other vehicles 235 at the traffic light 210. For example, the sensors 105 may capture images of an unsecured load of lumber on the back of a pick-up truck. The vehicle controller 110 may determine that the pick-up truck is faster than the two panel vans in the next lane 215, but that the unsecured load of lumber is a hazard to be avoided. The vehicle controller 110 then instructs the driver 115 or the vehicle 240 to go into the lane 215 behind the two panel vans for safety reasons. In another example, the vehicle controller 110 may determine that one of the doors of a trailer is unsecured and may move when the trailer moves. The vehicle controller 110 may draw the driver's attention to the open door and may suggest that the driver 115 not go in the lane 215 behind or next to the trailer based on the potential impact zone of the trailer door.

Figure 4:
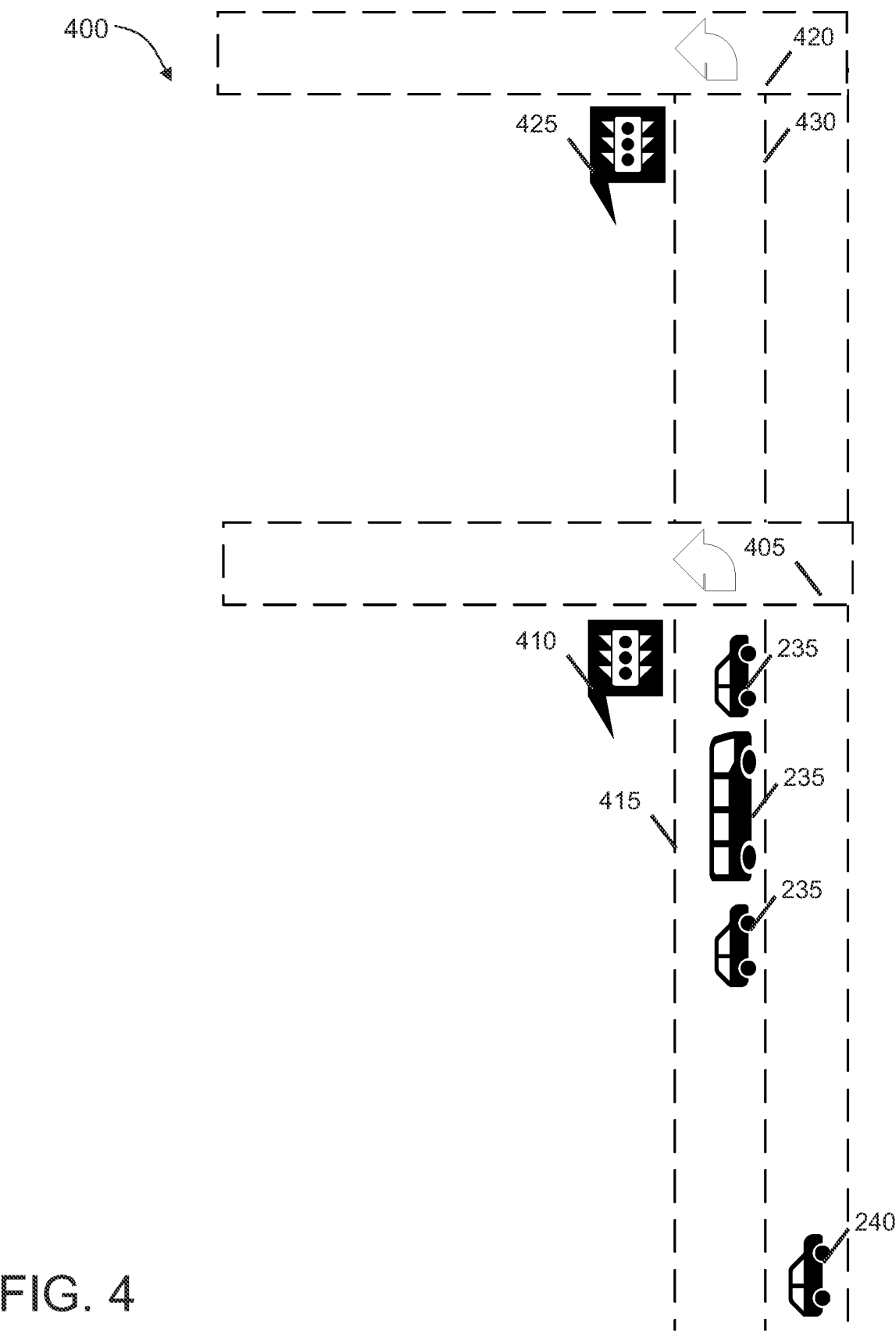
FIG. 4 illustrates a schematic diagram of an exemplary roadway with multiple left turn options, in accordance with one embodiment of the present disclosure.

FIG. 4 illustrates a schematic diagram 400 of an exemplary roadway with multiple left turn options, in accordance with one embodiment of the present disclosure.

In the exemplary embodiment, a first intersection 405 has a first left turn traffic signal 410 (also known as a first left turn traffic light 410) for a first left turn lane 415. In some embodiments, the first intersection 405 may include multiple left turn lanes 415. The first left turn lane 415 includes a plurality of other vehicles 235 waiting at the first left run light 410 to turn left.

A second intersection 420, which is subsequent to the first intersection 420, also includes a second left turn traffic signal 425 (also known as a second left turn traffic light 425) for a second left turn lane 430. In some embodiments, the second intersection 420 may include multiple left turn lanes 415. The second left turn lane 430 may include one or more other vehicles 235 waiting at the second left run light 425 to turn left.

In the exemplary embodiment, the user's vehicle 240 is approaching the first intersection 405 and is on a route the instructs the user to turn left.

Figure 5:
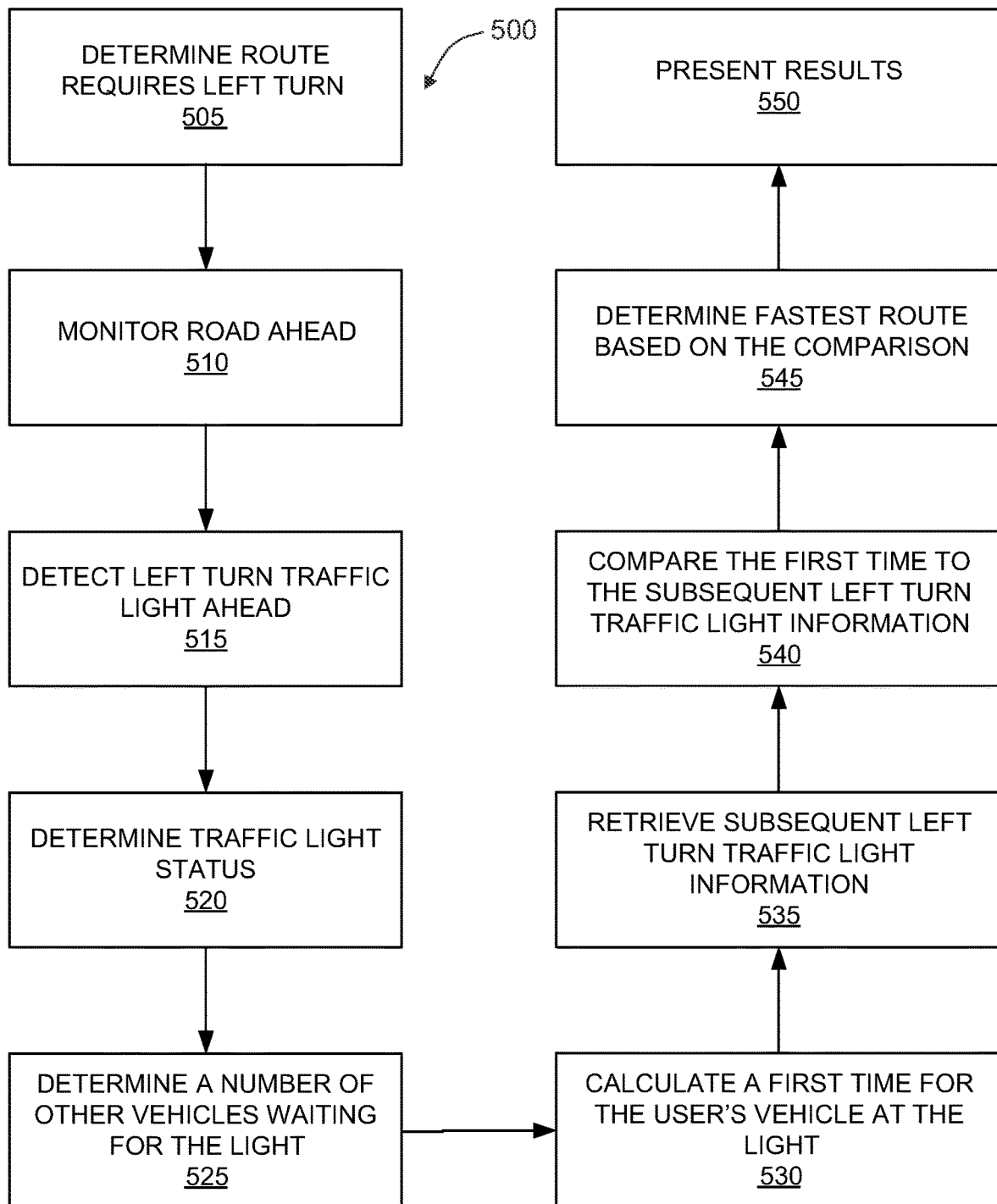
FIG. 5 illustrates a flowchart of a process for determining where to make a left hand turn at a traffic light in accordance with at least one embodiment.

FIG. 5 illustrates a flowchart of a process 500 for determining where to make a left hand turn at a traffic light 210 (shown in FIG. 2) in accordance with at least one embodiment. In the exemplary embodiment, process 500 is performed by the vehicle controller 110 (shown in FIG. 1) in the user's vehicle 240 (shown in FIG. 4). In other embodiments, portions of process 500 are performed by the vehicle controller 110 and other portions of the process are performed by one or more remote servers, such as vehicle traffic light controller 610 (shown in FIG. 6). In the exemplary embodiment, diagram 400 (shown in FIG. 4) is used to illustrate process 500.

In the exemplary embodiment, the vehicle controller 110 determines 505 that the current route of travel of the user's vehicle 240 requires a left turn. The vehicle controller 110 determines 505 that the user's current route requires a left hand turn from a route that the user is currently following such as from a mapping program or the vehicle controller 110 can determine 505 the user's desire to turn left through the use of turn signals.

The vehicle controller 110 monitors 510 the road ahead of the user's vehicle 230. The vehicle controller 110 receives sensor data from at least a first sensor 105 of the plurality of sensors 105 (both shown in FIG. 1). In some embodiments, the first sensor 105 includes at least one of a camera, RADAR, LIDAR, or other sensor able to detect objects at a distance.

Based on the received sensor data, the vehicle controller 110 detects 515 the first left turn traffic light 410 (shown in FIG. 4) ahead. The first left turn traffic light 410 is along the current route of travel of the vehicle 240. In the exemplary embodiment, the vehicle controller 110 detects 515 the first left turn traffic light 410 about half of a block away or the usual distance that the vehicle controller 110 would react to a red traffic light 210. Accordingly, this distance would vary based on the speed of the vehicle 240, the limitations of the plurality of sensors 105, current visibility, the stopping distance of the vehicle 240, as well as other environmental factors.

The vehicle controller 110 determines 520 the status of the first left turn traffic light 410. In some embodiments, the first sensor 105 can detect the surroundings in color and the determination 520 could be made based on analysis of the visible color of the first left turn traffic light 410. In other embodiments, the first sensor 105 can only detect the surroundings in greyscale and the determination 520 can be made based on the brightness of an illuminated portion of the first left turn traffic light 410. The vehicle controller 110 can also determine if the first left turn traffic light 410 changes, such as from green to red, or even if the traffic light 410 is flashing, such as yellow. In some embodiments, the vehicle controller 110 determines 520 the status based on timing, information provided from other vehicles 235, such as those already waiting at the traffic light 410, and/or information broadcast by the traffic light 410 itself. In some embodiments, the traffic light infrastructure broadcasts current light information to the other vehicles 235 in the surrounding area. This may include one or more countdowns until the first left turn traffic light 410 will change.

The vehicle controller 110 determines 525 a number of other vehicles 235 waiting in the first left turn lane 415 at the first left turn traffic light 410. The vehicle controller 110 uses the number of other vehicles 235 waiting at the first left turn traffic light 410 as an indicator of how long until the traffic light 410 changes from red to green. The number of other vehicles 235 can also be an indicator of how long the first left turn traffic light 410 allows vehicles 235 to turn and/or how backed-up the first left turn traffic light 410 is.

The vehicle controller 110 calculates 530 a first time for the user's vehicle 240 at the first left turn traffic light 410. The first time is the average time that it will take for the user's vehicle 240 to be able to make a left hand turn based on the traffic light status and the number of other vehicles 235 waiting. The vehicle controller 110 can determine the vehicle type and left turn profile for each other vehicle 235 that is waiting to turn left at the traffic light. The vehicles types can include, but are not limited to, sedan, sportscar, van, panel van, pick-up truck, bus, trolley car, public transportation, tractor trailer, 18-wheeler, RV (recreational vehicle), motorcycle, scooter, bicycle, trailer, emergency vehicle, farm vehicle, oversized vehicle, and/or any other type of vehicle. The vehicle controller 110 may also detect if the vehicle 235 is pulling a trailer, which will change its left turn profile. Based on the other vehicles 235 in the lane 415 and the type of each vehicle 235, the vehicle controller 110 calculates the first time for the user's vehicle 240 based on the combined left turn profile for the first left turn lane 415. For each other vehicle 235, the vehicle controller 110 determines a left turn profile based on the vehicle type. The left turn profile includes how fast the other vehicle 235 generally accelerates from a full stop and proceed to make a left turn. In some embodiments, the left turn profile determines how long it takes for average vehicles of the vehicle type to accelerate from stopped to complete a left turn. In some embodiments, the left turn profile is an average left turn time for the vehicle type. In other embodiments, the left turn profile is the actual observed acceleration for that vehicle 235, where the vehicle controller 110 has observed the same other vehicle 235 at previous left turns. The vehicle controller 110 calculates the left turn profile for all of the other vehicles 235 current in the first left turn lane 415 between the user's vehicle 240 and the first intersection 405. Some other vehicles 235 may have faster left turn profiles than others, but may be constrained by the other vehicles 235 in front of them. For example, if a sedan is behind an 18-wheeler pulling a trailer, the sedan will only be able to make the left turn at a speed and timing based on the 18-wheeler.

In some embodiments, the vehicle controller 110 also adds additional information to the calculation 530 based on the current weather conditions. In these embodiments, the vehicle controller 110 may update the acceleration profiles based on the current weather conditions, such as, but not limited to, rain, snow, low visibility, and/or other conditions. In still further embodiments, the vehicle controller 110 adjusts the acceleration profiles based on the time of day, including, but not limited to, day, night, twilight, dawn, rush hour, lunch hour, and/or other times that may be important to the timing of that particular intersection.

The vehicle controller 110 retrieves 535 subsequent left turn traffic light information. In some embodiments, the vehicle controller 110 retrieves 535 the information from one or more remote servers, such as vehicle traffic light controller 610 (shown in FIG. 6). The information may include, but is not limited to, timing information, a number of other vehicles at the subsequent traffic light, and/or other pertinent information. The remote servers may receive the information from one or more connected vehicles 100 that are at the subsequent left turn traffic light. The subsequent left turn traffic light is the second traffic light 425 at the second intersection 420, wherein there is a second left turn lane 430 (all shown in FIG. 4).

The vehicle controller 110 compares 540 the first time to the subsequent left turn traffic light information. In at least one embodiment, the comparison 540 involves the vehicle controller 110 determining the route time to use the second left turn traffic light 425 for a left turn including the first time from step 530. Then the vehicle controller 110 compares 540 that route time with a route time using the second left turn traffic light 425 to make the needed left turn. In some embodiments, the vehicle controller 110 may compare 540 the timing of multiple subsequent left turn traffic lights 210.

The vehicle controller 110 determines 545 a fastest route based on the comparison 540. Then the vehicle controller 110 presents 550 the results of the comparison 540. In some embodiments, the vehicle controller 110 presents 550 the results to the driver 115 (shown in FIG. 1), such as via the infotainment panel 130 or via a heads-up display in the front windshield of the user's vehicle 240. In other embodiments, where the user's vehicle 240 is an autonomous or semi-autonomous vehicle 240, the vehicle controller 110 uses the comparison 540 to determine which left turn traffic light 410 or 425 to use.

In the exemplary embodiment, the vehicle controller 110 calculates a cost function to determine which left turn traffic light 410 or 425 to suggest. The cost function may have a plurality of parameters which provide different weights, such as, but not limited to, acceleration, safety, user preferences, regional information, distance vs. time, weather conditions, time of day, and/other factors.

In many embodiments, the vehicle controller 110 and/or the remote servers, such as vehicle traffic light controller 610 (shown in FIG. 6), execute machine learning algorithms to calculate and/or update left-turn profiles and/or left turn light timings. Furthermore, the vehicle controller 110 and/or the remote servers can also learn the driving profile for the driver 115. If the driver 115 would prefer the shorter distance route, but doesn't mind the route being a certain amount slower, then the vehicle controller 110 may not recommend the second left turn traffic light 425 if it takes the driver 115 out of his/her way, even if the second left turn traffic light 425 would allow the user's vehicle 240 to reach its destination faster. In addition, the vehicle controller 110 and/or remote servers may learn the light timing as the user's vehicle 240 travels this particular route repeatedly. Furthermore, the vehicle controller 110 and/or remote servers may learn the light timing as multiple vehicles 100 travel this particular route and their sensor information is provided to the vehicle controller 110 and/or remote servers.

In some embodiments, the processing of process 500 is performed by the one or more remote servers, such as vehicle traffic light controller 610 (shown in FIG. 6), where the vehicle controller 110 provides the user's vehicle's sensor information to the remote servers and the remote servers present 550 the results and suggested lane to the vehicle controller 110. In some of these embodiments, the remote servers receive the sensor information from a plurality of vehicles 235 at the intersection and is able to use that information to improve the processing of lane suggestions for later user's vehicles 240 at the intersection. For example, a first user's vehicle 240 may be the second sedan at a first left turn traffic light 410, while a second user's vehicle 240 may be the first vehicle at a subsequent left turn traffic light 425. The sensor information from the first user's vehicle 240 is used to calculate 530 the first time, while the sensor information from the second user's vehicle 240 is used to calculate a second time for using the subsequent left turn traffic light 425. The first vehicle 240 and/or the second vehicle 240 could also provide information to the other vehicles 235 around them, such as through vehicle-to-vehicle communication or a vehicle mesh network.

In some embodiments, the sensor information could be provided by infrastructure, such as one or more cameras at the current left turn traffic light 410 and/or the subsequent left turn traffic light 425, where the cameras provide the sensor information to the user's vehicle 240, such as through short range broadcasts. The sensor information could include the images, number of vehicles 235, vehicle types, light timing, and other information.

Figure 6:
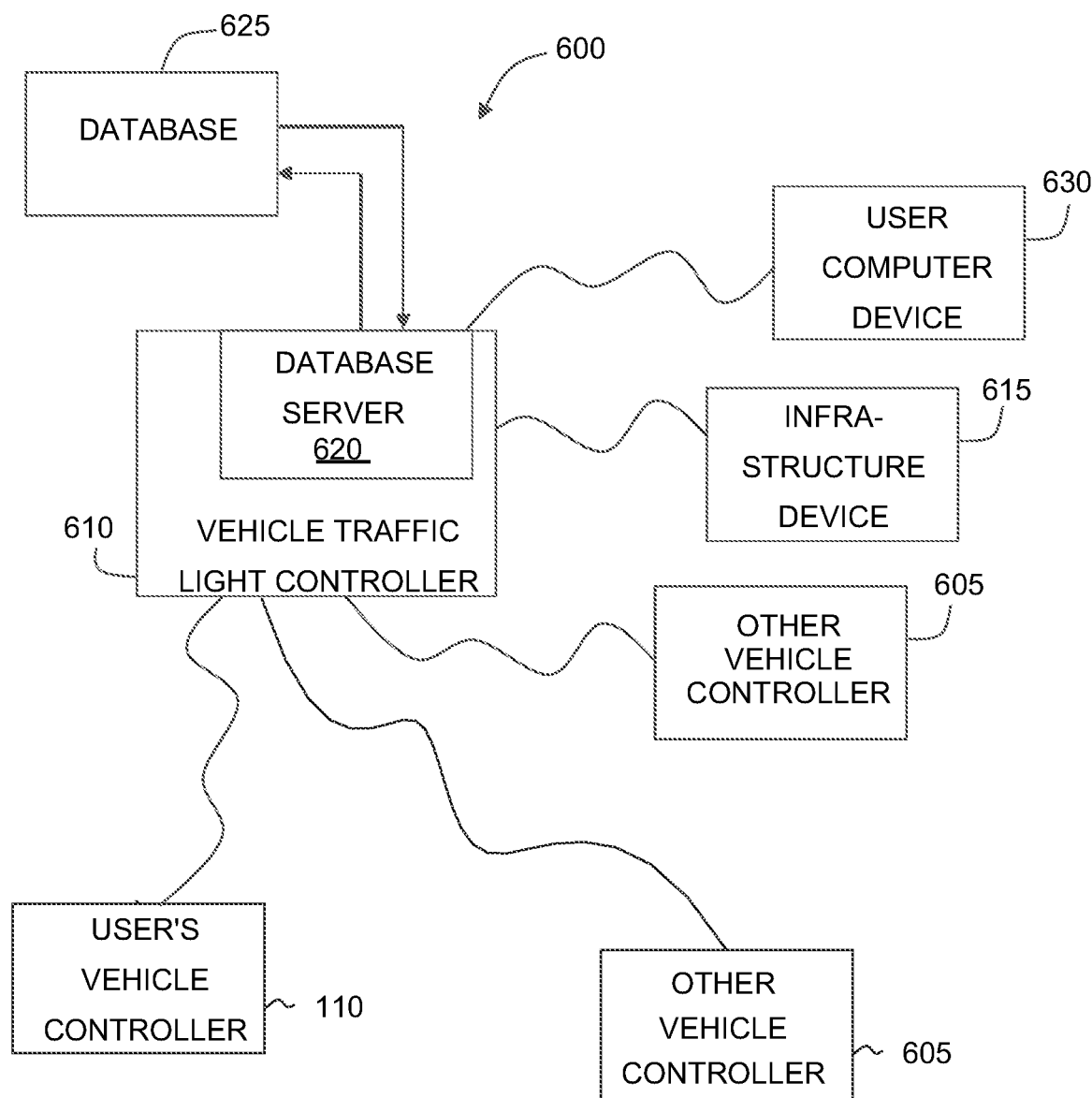
FIG. 6 illustrates a simplified block diagram of an exemplary computer system for implementing the processes shown in FIGS. 3 and 5.

FIG. 6 illustrates a simplified block diagram of an exemplary computer system 600 for implementing the processes 300 and 500 (shown in FIGS. 3 and 5). In the exemplary embodiment, computer system 600 may be used for monitoring vehicles 100 (shown in FIG. 1) for detecting traffic light patterns and determining appropriate vehicle routing. As described below in more detail, a vehicle traffic light controller 610 (also known as a vehicle traffic light server 610) may be configured to i) collect a first plurality of sensor information observed by at least the first sensor 105 (shown in FIG. 1) during operation of a vehicle 240 (shown in FIG. 2); ii) detect a red traffic signal 210 (shown in FIG. 2) in a direction of travel of the vehicle 240 based on the first plurality of sensor information; iii) determine a number of vehicles 235 in each lane 215 (both shown in FIG. 2) in front of the red traffic signal 210 based on the first plurality of sensor information; iv) determine a vehicle type for each vehicle 235 in each lane 215 in front of the red traffic signal 210 based on the first plurality of sensor information; v) calculate a lane acceleration profile for each lane 215 in front of the red traffic signal 210 based on the number of vehicles 235 and vehicle type for each vehicle 235 in each lane 215; vi) compare the lane acceleration profiles to determine a chosen lane 215; and vii) present the chosen lane 215.

The vehicle traffic light controller 610 (also known as a vehicle traffic light server 610) may also be configured to i) collect a first plurality of sensor information observed by at least the first sensor 105 during operation of a vehicle 240; ii) detect a first traffic signal 410 (shown in FIG. 4) in a direction of travel of the vehicle 240 based on the first plurality of sensor information, where the direction of travel includes a left turn at a traffic signal; iii) determine a status of the first traffic signal 410 based on the first plurality of sensor information; iv) determine a first timing for the left turn at the first traffic signal 410 based on the status of the first traffic signal 410; v) determine a second timing for the left turn at a second traffic signal 425 (shown in FIG. 4), where the second traffic signal 425 is subsequent to the first traffic signal 410; vi) compare the first timing with the second timing to determine a preferred route; and vii) present the preferred route.

In the exemplary embodiment, user's vehicle controller 110 and other vehicle controller 605 are computers that control one or more aspects of the operation of a vehicle 100 or user's vehicle 240. Other vehicle controller 605 is similar to vehicle controller 110. Furthermore, user's vehicle controller 110 and other vehicle controller 605 are in communication with one or more vehicle traffic light controllers 610, using the Internet or other network. More specifically, user's vehicle controller 110 and other vehicle controllers 605 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

In the example embodiment, an infrastructure device 615 is configured to provide traffic information. The traffic information may include, but is not limited to, traffic light timing, sensor information about one or more roadways, and/or traffic information. The infrastructure device 615 connects to the vehicle traffic light controller 610 through various wired or wireless interfaces including without limitation a network, such as a local area network (LAN) or a wide area network (WAN), dial-in-connections, cable modems, Internet connection, wireless, and special high-speed Integrated Services Digital Network (ISDN) lines. The infrastructure device 615 receives data about the current traffic conditions and reports that data to the vehicle traffic light controller 610. In other embodiments, the infrastructure device 615 is in communication with the user's vehicle controller 110 and other vehicle controllers 605 to provide traffic information in real-time or near real-time. In some embodiments, the infrastructure device 615 is associated with a traffic light 210. In further embodiments, the infrastructure device 615 provides images from one or more cameras at the traffic light 210. In still further embodiments, the infrastructure device 615 wirelessly broadcasts information to all vehicles in the nearby area, such as through Wi-Fi, Bluetooth, and/or ZigBee communications. In some embodiments, the infrastructure device 615 can also include a mapping program server or other program to assist with navigating the vehicle 100 or user's vehicle 240.

A database server 620 may be communicatively coupled to a database 625 that stores data. In one embodiment, database 625 may include traffic light timing information, acceleration profiles, left turn profiles, preferences, and vehicle type identification information. In the exemplary embodiment, database 625 may be stored remotely from vehicle traffic light controller 610. In some embodiments, database 625 may be decentralized. In the exemplary embodiment, the user may access database 625 via user computer device 630 by logging onto vehicle traffic light controller 610, as described herein.

In the exemplary embodiment, user computer devices 630 are computers that include a web browser or a software application, which enables user computer devices 630 to access remote computer devices, such as vehicle traffic light controller 610, using the Internet or other network. More specifically, user computer devices 630 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 630 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Vehicle traffic light controller 610 may be communicatively coupled with one or more of user's vehicle controller 110, other vehicle controller 605, infrastructure device 615, and user computer device 630. In some embodiments, vehicle traffic light controller 610 may be associated with, or is part of a computer network associated with a vehicle manufacturer or a travel information provider, or in communication with vehicle manufacturing network or travel information provider network. In other embodiments, vehicle traffic light controller 610 may be associated with a third party and is merely in communication with the vehicle manufacturing or travel information providing networks. In still further embodiments, the vehicle traffic light controller 610 may be a part of the vehicle controller 110 and executed on the user's vehicle 100. More specifically, the vehicle traffic light controller 610 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. The vehicle traffic light controller 610 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, the vehicle traffic light controller 610 hosts an application or website that allows the user's vehicle controller 110 and the other vehicle controllers 605 to access the functionality described herein. In some further embodiments, vehicle controller 110 and other vehicle controllers 605 include an application that facilitates communication with the vehicle traffic light controller 610.

Figure 7:
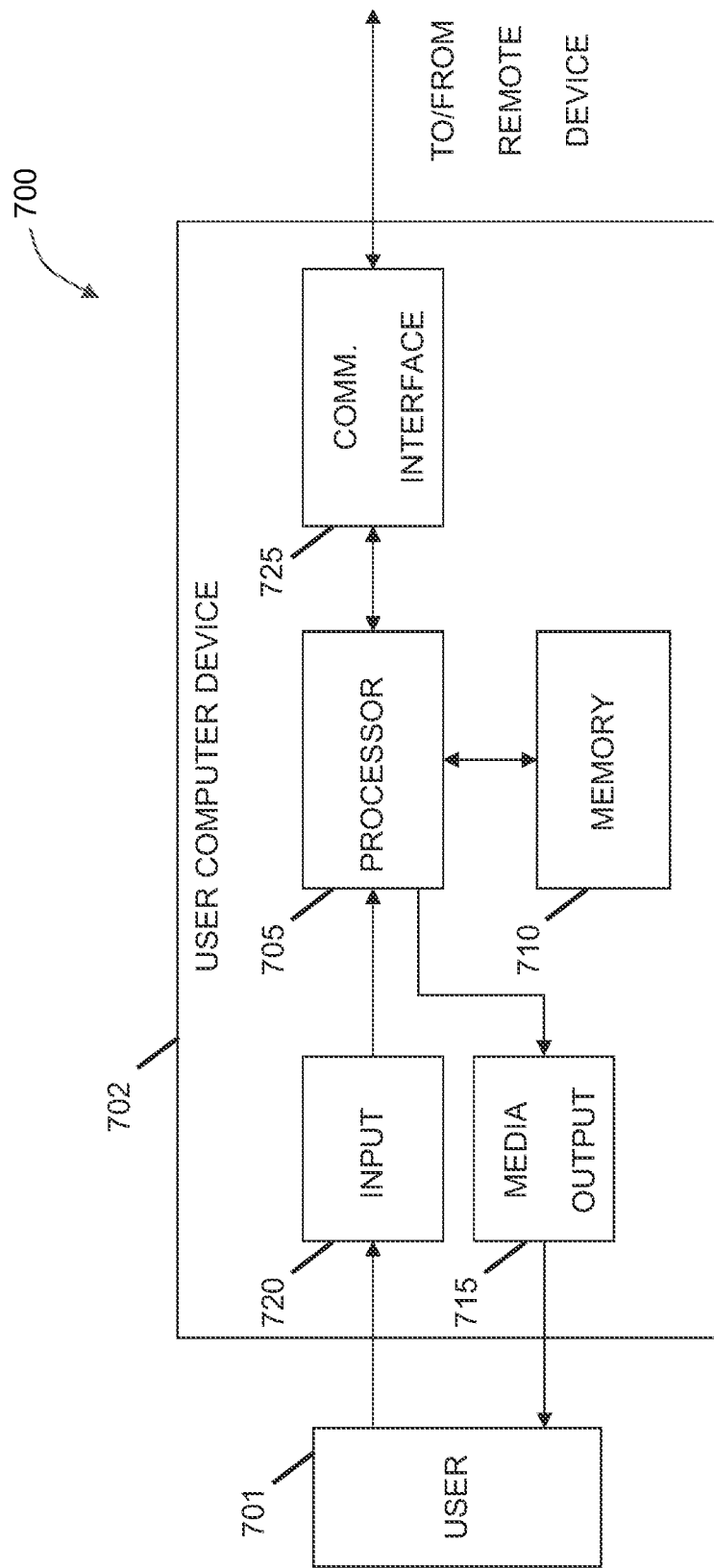
FIG. 7 illustrates an exemplary configuration of a user computer device, in accordance with one embodiment of the present disclosure.

In FIG. 7 depicts an exemplary configuration of the computer devices shown in FIG. 1, in accordance with one embodiment of the present disclosure. User computer device 702 may be operated by a user 701. In the exemplary embodiment, user 701 may be similar to driver 115 (shown in FIG. 1). User computer device 702 may include, but is not limited to, vehicle controller 110, mobile device 125 (both shown in FIG. 1), other vehicle controller 605, vehicle traffic light controller 610, infrastructure device 615, and user computer device 630 (all shown in FIG. 6). User computer device 702 may include a processor 705 for executing instructions. In some embodiments, executable instructions are stored in a memory area 710. Processor 705 may include one or more processing units (e.g., in a multi-core configuration). Memory area 710 may be any device allowing information such as executable instructions and/or transaction data to be stored and retrieved. Memory area 710 may include one or more computer readable media.

User computer device 702 may also include at least one media output component 715 for presenting information to user 701. Media output component 715 may be any component capable of conveying information to user 701. In some embodiments, media output component 715 may include an output adapter (not shown) such as a video adapter and/or an audio adapter. An output adapter may be operatively coupled to processor 705 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 715 may be configured to present a graphical user interface (e.g., a web browser and/or a client application) to user 701, such as through the infotainment panel 130 (shown in FIG. 1). A graphical user interface may include, for example, route information. In some embodiments, user computer device 702 may include an input device 720 for receiving input from user 701. User 701 may use input device 720 to, without limitation, select and/or enter one or more locations to travel to.

Input device 720 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 715 and input device 720.

User computer device 702 may also include a communication interface 725, communicatively coupled to a remote device such as mobile device 125 or vehicle controller 110. Communication interface 725 may include, for example, a wired or wireless network adapter and/or a wireless data transceiver for use with a mobile telecommunications network.

Stored in memory area 710 are, for example, computer readable instructions for providing a user interface to user 701 via media output component 715 and, optionally, receiving and processing input from input device 720. A user interface may include, among other possibilities, a web browser and/or a client application. Web browsers enable users, such as user 701, to display and interact with media and other information typically embedded on a web page or a website from vehicle controller 110. A client application allows user 701 to interact with, for example, vehicle controller 110. For example, instructions may be stored by a cloud service, and the output of the execution of the instructions sent to the media output component 715.

Processor 705 executes computer-executable instructions for implementing aspects of the disclosure. In some embodiments, the processor 705 is transformed into a special purpose microprocessor by executing computer-executable instructions or by otherwise being programmed. For example, the processor 705 may be programmed with the instructions such as illustrated in FIGS. 3 and 5.

In some embodiments, user computer device 702 may include, or be in communication with, one or more sensors, such as sensor 105 (shown in FIG. 1). User computer device 702 may be configured to receive data from the one or more sensors and store the received data in memory area 710. Furthermore, user computer device 702 may be configured to transmit the sensor data to a remote computer device, such as vehicle controller 110 or mobile device 125, through communication interface 725.

The types of autonomous or semi-autonomous vehicle-related functionality or technology that may be used with the present embodiments to replace human driver actions may include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality.

Figure 8:
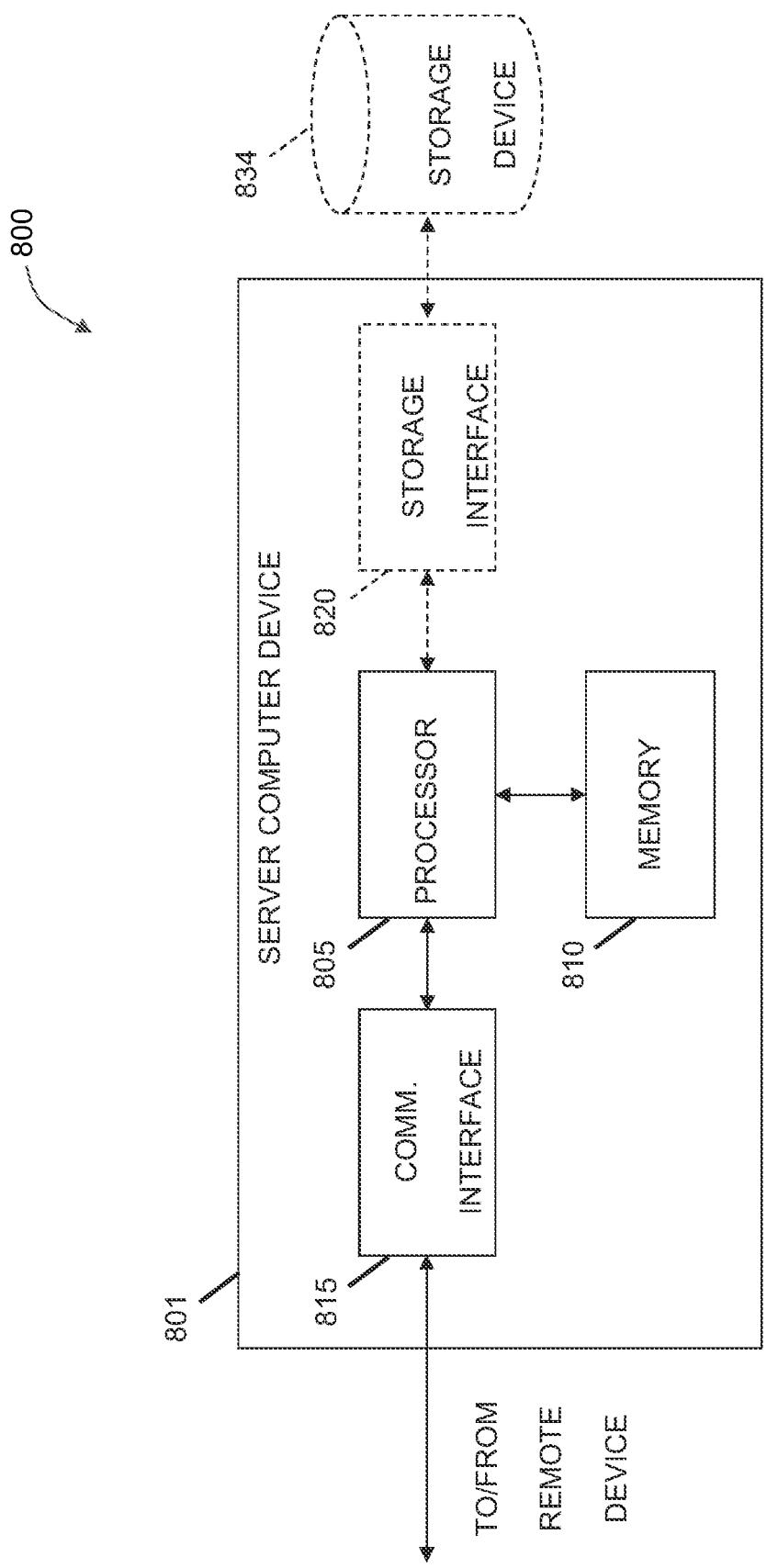
FIG. 8 illustrates an exemplary configuration of a server computer device, in accordance with one embodiment of the present disclosure.

FIG. 8 illustrates an example configuration of the server system shown in FIG. 6, in accordance with one embodiment of the present disclosure. Server computer device 801 may include, but is not limited to, vehicle controller 110 (shown in FIG. 1), vehicle traffic light controller 605, and database server 620 (both shown in FIG. 6). Server computer device 801 also includes a processor 805 for executing instructions. Instructions may be stored in a memory area 810. Processor 805 may include one or more processing units (e.g., in a multi-core configuration).

Processor 805 is operatively coupled to a communication interface 815 such that server computer device 801 is capable of communicating with a remote device such as another server computer device 801, another vehicle traffic light controller 605, vehicle controller 110, or user computer device 630 (shown in FIG. 6). For example, communication interface 815 may receive requests from vehicle controllers 110 and other vehicle controllers 605 via the Internet, as illustrated in FIG. 6.

Processor 805 may also be operatively coupled to a storage device 834. Storage device 834 is any computer-operated hardware suitable for storing and/or retrieving data, such as, but not limited to, data associated with database 625 (shown in FIG. 6). In some embodiments, storage device 834 is integrated in server computer device 801. For example, server computer device 801 may include one or more hard disk drives as storage device 834. In other embodiments, storage device 834 is external to server computer device 801 and may be accessed by a plurality of server computer devices 801. For example, storage device 834 may include a storage area network (SAN), a network attached storage (NAS) system, and/or multiple storage units such as hard disks and/or solid state disks in a redundant array of inexpensive disks (RAID) configuration.

In some embodiments, processor 805 is operatively coupled to storage device 834 via a storage interface 820. Storage interface 820 is any component capable of providing processor 805 with access to storage device 834. Storage interface 820 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 805 with access to storage device 834.

Processor 805 executes computer-executable instructions for implementing aspects of the disclosure. In some embodiments, the processor 805 is transformed into a special purpose microprocessor by executing computer-executable instructions or by otherwise being programmed. For example, the processor 805 is programmed with instructions such as illustrated in FIGS. 3 and 5.

In the exemplary embodiment, the vehicle controller 110 collects a first plurality of sensor information observed by at least the first sensor 105 during operation of a vehicle 100. The vehicle controller 110 detects a red traffic signal 210 in a direction of travel of the vehicle 100 based on the first plurality of sensor information. The vehicle controller 110 determines a number of other vehicles 235 in each lane 215 in front of the red traffic signal 210 based on the first plurality of sensor information. The vehicle controller 110 determines a vehicle type for each other vehicle 235 in each lane 215 in front of the red traffic signal 210 based on the first plurality of sensor information. The vehicle controller 110 calculates a lane acceleration profile for each lane 215 in front of the red traffic signal 210 based on the number of other vehicles 235 and vehicle type for each other vehicle in each lane 215. The vehicle controller 110 compares the lane acceleration profiles to determine a chosen lane 215. The vehicle controller 110 presents the chosen lane 215.

In some further embodiments, the vehicle controller 110 is further programmed to store a plurality of vehicle acceleration profiles for a plurality of vehicle types. Each vehicle acceleration profile represents an amount of time for the corresponding vehicle type of the plurality of vehicle types to accelerate from a stop. The vehicle controller 110 receive the plurality of vehicle acceleration profiles from a remote server.

In still further embodiments, the vehicle controller 110 determines if a first vehicle 235 is towing a trailer and adjusts the vehicle acceleration profile for the first vehicle 235 based on the trailer.

In additional embodiments, the vehicle controller 110 detects a safety issue based on the plurality of sensors 105 and determines the chosen lane 215 based on the comparison of the lane acceleration profiles and the safety issue.

In some embodiments, the first sensor 105 includes at least one camera.

In further embodiments, the vehicle controller 110 determines a number of lanes 215 in front of the red traffic signal. For each lane, the vehicle controller 110 determines a number of vehicles 235 in the corresponding lane 215. The vehicle controller 110 determines a desired direction of travel for the vehicle 100 and filters out lanes 215 not leading in the desired direction of travel for the vehicle 100.

In still additional embodiments, the vehicle controller 110 steers the vehicle 100 into the chosen lane.

In some additional embodiment, the vehicle 100 includes a display device, such as infotainment panel 130 (shown in FIG. 1) or a head-up display in the front windshield. the vehicle controller 110 displays the chosen lane on via the display device.

In further embodiments, the vehicle controller 110 receives a second plurality of sensor information from a second vehicle 100 at the red traffic signal 210. In other embodiments, the vehicle controller 110 receives a second plurality of sensor information from one or more infrastructure based sensors at the red traffic signal 210.

In still other embodiments, the vehicle controller 110 observes acceleration of a first other vehicle 235 at a first traffic signal 210. The vehicle controller 110 detects the first other vehicle 235 at a second traffic signal 210. The vehicle controller 110 assign the observed acceleration to the first other vehicle 235 at the second traffic signal 210.

In other embodiments, a computer device, such as vehicle traffic light controller 610 (shown in FIG. 6), collects a first plurality of sensor information observed by a first sensor 105 during operation of a vehicle 100. The computer device detects a red traffic signal 210 in a direction of travel of the vehicle 100 based on the first plurality of sensor information. The computer device also determines a number of vehicles 235 in each lane 215 in front of the red traffic signal 210 based on the first plurality of sensor information. The computer device further determines a vehicle type for each vehicle 235 in each lane in front of the red traffic signal 210 based on the first plurality of sensor information. In addition, the computer device calculates a lane acceleration profile for each lane 215 in front of the red traffic signal 210 based on the number of vehicles 235 and vehicle type for each vehicle 235 in each lane. Moreover, the computer device compares the lane acceleration profiles to determine a chosen lane 215. Furthermore, the computer device presents the chosen lane 215.

In further embodiments, the computer device is remote from the vehicle 100. The computer device receives the first plurality of sensor information wirelessly from the vehicle 100. The computer device performs the steps described above and then wirelessly presents the chosen lane 215 to the vehicle 100.

In additional embodiments, the vehicle controller 110 collects a first plurality of sensor information observed by at least the first sensor 105 during operation of a vehicle 100. The vehicle controller 110 detects a first traffic signal 410 in a direction of travel of the vehicle 100 based on the first plurality of sensor information. The direction of travel includes a left turn at a traffic signal 210. The vehicle controller 110 determines a status of the first traffic signal 410 based on the first plurality of sensor information. The vehicle controller 110 determines a first timing for the left turn at the first traffic signal 410 based on the status of the first traffic signal 410. The vehicle controller 110 determines a second timing for the left turn at a second traffic signal 425. The second traffic signal 425 is subsequent to the first traffic signal 410. The vehicle controller 110 compares the first timing with the second timing to determine a preferred route. The vehicle controller 110 presents the preferred route.

In some further embodiments, the vehicle controller 110 determines a number of lanes 415 in front of the first traffic signal 410. For each lane 415, the vehicle controller 110 determines a number of vehicles 235 in the corresponding lane 415. The vehicle controller 110 determines the first timing based on the number of vehicles 235 in the corresponding lanes 415 in front of the first traffic signal 410. The vehicle controller 110 determines the status of the first traffic signal 410 based on the number of vehicles 235 at the first traffic signal 410.

In still further embodiments, the vehicle controller 110 determines the first timing based on a number of vehicles 235 in a left turn lane 415 at the first traffic signal 410. Then the vehicle controller 110 determines the first timing based on a vehicle type of each vehicle 235 in the left turn lane 415 at the first traffic signal 410.

In some embodiments, the vehicle controller 110 retrieves timing information for the first traffic signal 410 based on historical observations of the first traffic signal 410. The historical observations of the first traffic signal 410 are based on sensor information from the plurality of sensors of the vehicle 100. The historical observations of the first traffic signal 410 can also be based on sensor information from a plurality of vehicles 235 each with a plurality of sensors 105.

In further embodiments, the vehicle controller 110 determines the second timing for the left turn at the second traffic signal 425 based on a plurality of historical observations by the plurality of sensors 105 of the vehicle 100 at a plurality of points in time. In other embodiments, the vehicle controller 110 determines the second timing for the left turn at the second traffic signal 425 based on a plurality of historical observations by a plurality of vehicles 235 each with a plurality of sensor 105 at a plurality of points in time. In still other embodiments, the vehicle controller 110 determines the second timing for the left turn at the second traffic signal 425 based on sensor data from at least one vehicle 235 currently at the second traffic signal 425.

In some embodiments, the vehicle controller 110 steers the vehicle 100 according to the preferred route. In other embodiments, the vehicle 100 further includes a display device, such as infotainment panel 130 or a heads-up display. The vehicle controller 110 displays the preferred route on via the display device.

In some additional embodiments, the vehicle controller 110 receives a second plurality of sensor information from a second vehicle 235 at the first traffic signal 410.

In some additional embodiments, the vehicle controller 110 receives a second plurality of sensor information from one or more infrastructure based sensors at the first traffic signal 410.

In further embodiments, the vehicle controller 110 determines a third timing for the left turn at a third traffic signal 425. The third traffic signal 425 is subsequent to the second traffic signal 425. The vehicle controller 110 compares the first timing with the second timing and the third timing to determine the preferred route.

In still further embodiments, the vehicle controller 110 compares the first timing and the second timing with a plurality of user preferences to determine the preferred route.

For the methods discussed directly above, the wireless communication-based autonomous or semi-autonomous vehicle technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality may include and/or be related to: driver alertness or responsive monitoring; pedestrian detection; artificial intelligence and/or back-up systems; navigation or GPS-related systems; security and/or anti-hacking measures; and/or theft prevention systems.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on vehicles, stations, nodes, or mobile devices, or associated with smart infrastructures and/or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In the exemplary embodiment, a processing element may be instructed to execute one or more of the processes and subprocesses described above by providing the processing element with computer-executable instructions to perform such steps/sub-steps, and store collected data (e.g., vehicle profiles, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, traffic timing, previous trips, and/or actual timing. The machine learning programs may utilize deep learning algorithms that may be primarily focused on pattern recognition, and may be trained after processing multiple examples. The machine learning programs may include Bayesian Program Learning (BPL), voice recognition and synthesis, image or object recognition, optical character recognition, and/or natural language processing-either individually or in combination. The machine learning programs may also include natural language processing, semantic analysis, automatic reasoning, and/or machine learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to determine user preferences and detect traffic light patterns.

Based upon these analyses, the processing element may learn how to identify characteristics and patterns that may then be applied to analyzing image data, model data, and/or other data. For example, the processing element may learn, to identify trends of traffic based on traffic light timing and vehicle types at an intersection. The processing element may also learn how to identify trends that may not be readily apparent based upon collected traffic data, such as trends that identifying faster routes at different times of day.

The exemplary systems and methods described and illustrated herein therefore significantly increase the safety of operation of autonomous and semi-autonomous vehicles by reducing the potential for damage to the vehicles and the vehicle's surroundings.

The present systems and methods are further advantageous over conventional techniques the embodiments herein are not confined to a single type of vehicle and/or situation but may instead allow for versatile operation within multiple different types of vehicles, including ground craft, watercraft, aircraft, and spacecraft. Accordingly, these novel techniques are of particular value to vehicle manufacturers who desire to have these methods and systems available for the users of their vehicles.

Exemplary embodiments of systems and methods for securely navigating traffic lights are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A vehicle comprising:
    a plurality of sensors including a first sensor; and
    a vehicle controller, wherein the vehicle controller is programmed to:
        collect a first plurality of sensor information observed by at least the first sensor during operation of a vehicle;
        detect a first traffic signal in a direction of travel of the vehicle based on the first plurality of sensor information, wherein the direction of travel includes a left turn at a traffic signal;
        determine a status of the first traffic signal based on the first plurality of sensor information;
        determine an acceleration profile of at least one lane of the first traffic signal;
        determine a first timing for the left turn at the first traffic signal based on the status of the first traffic signal and the acceleration profile of the at least one lane of the first traffic signal;
        determine a second timing for the left turn at a second traffic signal, wherein the second traffic signal is subsequent to the first traffic signal;
        compare the first timing with the second timing to determine a preferred route; and
        direct the vehicle according to the preferred route.

2. The vehicle of claim 1, wherein the vehicle controller is further programmed to:
    determine a number of lanes in front of the first traffic signal; and
    for each lane of the number of lanes, determine a number of vehicles in the lane.

3. The vehicle of claim 2, wherein the vehicle controller is further programmed to determine the first timing based on the number of vehicles in the lanes in front of the first traffic signal.

4. The vehicle of claim 2, wherein the vehicle controller is further programmed to determine the status of the first traffic signal based on the number of vehicles at the first traffic signal.

5. The vehicle of claim 1, wherein the vehicle controller is further programmed to determine an acceleration profile for each vehicle in the at least one lane of the first traffic signal, wherein determining the acceleration profile of the at least one lane is further based upon the acceleration profiles of the vehicles in the at least one lane.

6. The vehicle of claim 5, wherein the vehicle controller is further programmed to:
    determine the acceleration profile for each vehicle in the at least one lane based on a vehicle type of each vehicle.

7. The vehicle of claim 6, wherein the vehicle controller is further programmed to: adjust the acceleration profile for each vehicle based on at least one of a time of day or a weather condition.

8. The vehicle of claim 1, wherein the vehicle controller is further programmed to retrieve timing information for the first traffic signal based on historical observations of the first traffic signal.

9. The vehicle of claim 8, wherein the historical observations of the first traffic signal are based on sensor information from the plurality of sensors of the vehicle.

10. The vehicle of claim 8, wherein the historical observations of the first traffic signal are based on sensor information from a plurality of vehicles each with a plurality of sensors.

11. The vehicle of claim 1, wherein the vehicle controller is further programmed to determine the second timing for the left turn at the second traffic signal based on a plurality of historical observations by the plurality of sensors of the vehicle at a plurality of points in time.

12. The vehicle of claim 1, wherein the vehicle controller is further programmed to determine the second timing for the left turn at the second traffic signal based on a plurality of historical observations by a plurality of vehicles each with a plurality of sensors at a plurality of points in time.

13. The vehicle of claim 1, wherein the vehicle controller is further programmed to determine the second timing for the left turn at the second traffic signal based on sensor data from at least one vehicle currently at the second traffic signal.

14. The vehicle of claim 1, wherein the vehicle controller is further programmed to:
    receive timing data associated with the first traffic signal from a remote server; and
    wherein determining the first timing is further based upon the timing data.

15. The vehicle of claim 1, wherein the vehicle further includes a display device, and wherein the vehicle controller is further programmed to display the preferred route on via the display device.

16. The vehicle of claim 1, wherein the vehicle controller is further programmed to receive a second plurality of sensor information from a second vehicle at the first traffic signal, and wherein the preferred route is further determined based upon the second plurality of sensor information.

17. The vehicle of claim 1, wherein the vehicle controller is further programmed to receive a second plurality of sensor information from one or more infrastructure based sensors at the first traffic signal.

18. The vehicle of claim 1, wherein the vehicle controller is further programmed to compare the first timing and the second timing with a plurality of user preferences to determine the preferred route.

19. A computer device comprising:
- at least one memory; and
- at least one processor in communication with the at least one memory, the at least one processor programmed to:
  - collect a first plurality of sensor information observed by at least a first sensor during operation of a vehicle;
  - detect a first traffic signal in a direction of travel of the vehicle based on the first plurality of sensor information, wherein the direction of travel includes a left turn at a traffic signal;
  - determine a status of the first traffic signal based on the first plurality of sensor information;
  - determine an acceleration profile of at least one lane of the first traffic signal;
  - determine a first timing for the left turn at the first traffic signal based on the status of the first traffic signal and the acceleration profile of the at least one lane of the first traffic signal;
  - determine a second timing for the left turn at a second traffic signal, wherein the second traffic signal is subsequent to the first traffic signal;
  - compare the first timing with the second timing to determine a preferred route; and
  - direct the vehicle according to the preferred route.

20. A method for controlling a vehicle, the method implemented by a vehicle controller associated with the vehicle comprising at least one processor in communication with at least one memory, the method comprising:
- collecting a first plurality of sensor information observed by at least a first sensor during operation of a vehicle;
- detecting a first traffic signal in a direction of travel of the vehicle based on the first plurality of sensor information, wherein the direction of travel includes a left turn at a traffic signal;
- determining a status of the first traffic signal based on the first plurality of sensor information;
- determining an acceleration profile of at least one lane of the first traffic signal;
- determining a first timing for the left turn at the first traffic signal based on the status of the first traffic signal and the acceleration profile of the at least one lane of the first traffic signal;
- determining a second timing for the left turn at a second traffic signal, wherein the second traffic signal is subsequent to the first traffic signal;
- comparing the first timing with the second timing to determine a preferred route; and
- directing the vehicle according to the preferred route.

* * * * *